D. SAGER.
CORN HUSKER.

No. 66,255. Patented July 2, 1867.

Witnesses.

Inventor.
Daniel Sager

United States Patent Office.

DANIEL SAGER, OF NEW YORK, N. Y.

Letters Patent No. 66,255, dated July 2, 1867.

---

IMPROVEMENT IN MACHINE FOR HUSKING CORN.

---

The Schedule referred to in these Letters Patent and making part of the same.

---

TO ALL WHOM IT MAY CONCERN:

Be it known that I, DANIEL SAGER, of the city, county, and State of New York, have invented a new and useful Machine for Husking Corn; and I hereby declare that the following is a full and exact description of the same, reference being had to the accompanying drawings, making a part of this specification, in which—

Figure 1:
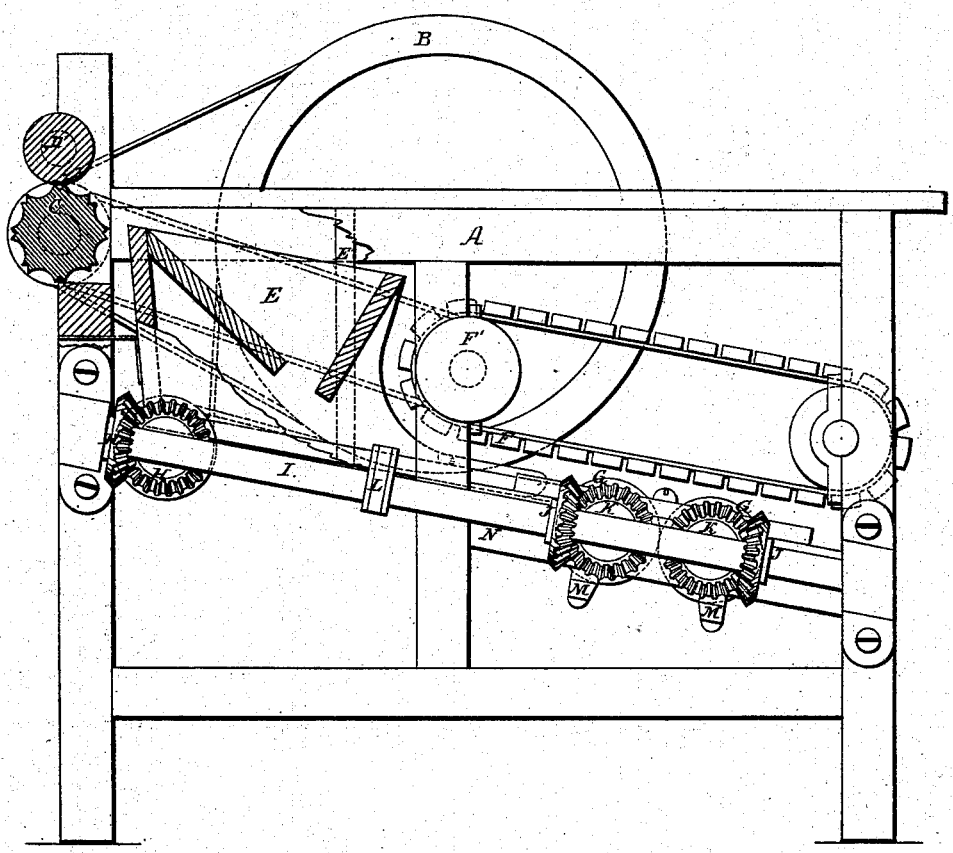

Figure 1 is a side elevation with a portion of the framing removed.

Figure 2:
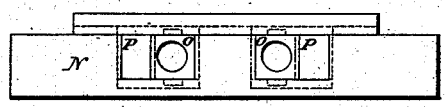

Figure 2, a side elevation of the bearings for the husking-roller; and

Figure 3:
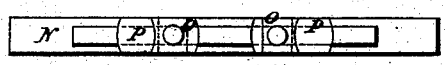

Figure 3, a plan view of the same.

My invention relates to a novel construction of machinery for picking the ears of corn from the stalk and subsequently stripping the husks therefrom; and it consists, first, in a novel arrangement of mechanical devices for that purpose; secondly, in a peculiar manner of delivering and directing the course of the ears on their passage from the picker to the husking mechanism; thirdly, in the arrangement and application of an endless apron for feeding the ears to the rollers, rotating them during the operation of husking, and finally discharging them from the machine; fourthly, in a novel method of supporting the husking-rollers so as to render them self-adjusting; and fifthly, in the adaptation of adjustable blades to the under side of the husking-rollers, for the purpose of clearing them of any adhering substance.

The following description will enable others skilled in the art to make and use my invention.

A is the frame. B is the driving-wheel. C is a grooved roller or picker, made of metal, and presenting a series of cutting edges formed by alternate wide and narrow grooves, whereby the ears are broken from the stalk by the aid of the roller D. The ears as they fall from the picker are caught by the shaker E, having a series of slats placed so as to form one or more orifices, so that the ears will be presented to the husking-rollers in the desired position. The endless apron F, formed by a series of slats secured to two belts, is driven by the pulley F' on the end of a roller. The slats of this apron serve to keep down and revolve the ears on the husking-rollers, and to remove the ears when they have been husked. The husking-rollers G G are made of layers of wood held on a shaft, the grain being crossed at each alternate layer, so that the form thereof may not be affected by the shrinkage of the wood, and the end grain of the wood presenting a slightly roughened surface more readily takes hold of the husks. These rollers are held in bearings O O in the side-pieces N N, and are held in contact by means of the springs P P, which allow the rollers to spread when any thick part of the husk or stalk may pass through them. The bearings are provided on their top and bottom sides with rounded pins, which slide or work in a groove provided in the side-pieces N N, thus allowing the rollers to be spread apart either parallel or obliquely. The husking-rollers are driven by means of gearing. The driving-wheels J J being placed at the outer sides of each pair of the roller-wheels K K are not fully in gear, so that when the obstructions pass through the rollers and they are spread apart the wheels are meshed deeper in gear where they have greater strength, thus securing the greatest strength when the greatest power is required. The driving-wheels J J are placed on a shaft, I, which derives its motion through the bevel-wheels H H, one of which is placed on a shaft running across the machine, which is driven by a belt running from the driving-wheel B to a pulley placed on the other end of the cross-shaft. The shaker E is fastened to the frame at the rear end by means of a knee-piece working on a pin, to admit of its having a lateral motion given to it by means of the eccentric wheel L on the shaft I, its forward end being held up by means of flexible straps or links E'. The blades M M are placed under the husking-rollers for the purpose of cleaning them of any adhering substances. They are made adjustable by means of screws passing through them, and by India-rubber or other springs placed between them and the under side of the side-pieces N N.

The operation of the machine is as follows: The stalks bearing the corn are placed on the top of the machine and are fed into the picker C, the large grooves of which admit the stalk to pass in between it and the roller D, the double edge of the small grooves giving a more secure hold of the stalk, especially when the cutting edges have become dull from use, while the larger grooves freely admit the entry of the stalks. They are not large enough to receive the ears, which are broken from them and drop upon the slats of the shaker E, from whence they are dislodged by its vibratory motion, and passing through the orifice upon its inclined bottom roll between the apron F, and the husking-rollers G G being driven at a high speed their surfaces catch the fibre of the husk and strip it from the ear, which receives a rolling motion from the apron F so as to present every part of the surface to the action of the husking-rollers. After the ears are husked they are rolled off from the husking-rollers by the continued motion of the apron, and to effect this in a more thorough manner, the slats of the apron may be made of varying thickness, if desired. The husking-rollers may be made of pieces of raw hide clamped or secured to a shaft by means of screws, instead of wood, as herein described. Motion may also be given to the shaker in a vertical instead of lateral direction, and the shaker and husking-rollers so arranged in relation to each other that the ears may be delivered endwise at the end of the husking-rollers and the same effect produced. The shaker may also be made without the slats or orifices, depending upon vibratory motion to effect the turning of the corn. Gear-wheels may be substituted when desired for the pulleys and belts shown in the drawings.

Among the advantages I claim for my machine are its certainty of action and durability. By means of the shaker the ears are presented to the husking-rollers in the proper position. By the apron it is held and rolled upon the husking-rollers until all the husk is removed. By the use of rollers having yielding bearings I overcome the difficulty encountered by the use of elastic rollers with rigid bearings, which are soon destroyed by use, and also overcome the difficulty met with in the use of non-elastic rollers which will not yield to the varying thicknesses of the husk and stalk, and which also have been found to partially shell the corn from the ear during the process of husking. The husking-rollers formed in this manner, while they are not covered by an elastic substance, possess sufficient elasticity to allow any unusually thick substance to pass between them, as well as a grasping power not found in a roller made of iron or other non-elastic material.

What I claim as my invention, and desire to secure by Letters Patent, is—

1. The arrangement of the picker C, shaker E, endless apron F, husking-rollers G G, and adjustable blades M M, essentially as described, for the purpose set forth.

2. The shaker E, for delivering and directing the course of the ears by motion communicated through the eccentric L, or its equivalent, in the manner substantially as specified.

3. The endless apron F, arranged with relation to the husking-rollers G G, so as to carry the ears of corn thereto and rotate them whilst husking, and afterwards to discharge them from the machine, essentially as described.

4. The husking-rollers G G, supported in bearings O O, having elastic supports P P, substantially as and for the purpose set forth.

5. The adjustable blades M M, essentially as and for the purpose specified.

DANIEL SAGER.

Witnesses:
W. S. B. BENNET,
WM. H. LOW.